United States Patent [19]
Ohmori et al.

[11] Patent Number: 6,164,149
[45] Date of Patent: Dec. 26, 2000

[54] SHIFTING DEVICE FOR SYNCHROMESH-TYPE TRANSMISSION

[75] Inventors: Makoto Ohmori, Nagoya; Michiaki Nakao, Toyota; Takao Ohi, Okazaki; Shinji Ogawa, Toyota, all of Japan

[73] Assignee: Aisin AI Co., Ltd., Nishio, Japan

[21] Appl. No.: 09/359,744

[22] Filed: Jul. 23, 1999

[30] Foreign Application Priority Data

Jul. 30, 1998 [JP] Japan .................................. 10-215879

[51] Int. Cl.$^7$ ........................... F16H 59/00; F16H 61/00; F16H 63/00
[52] U.S. Cl. ...................... 74/336 R; 477/121; 477/124; 74/335
[58] Field of Search ..................................... 477/111, 124, 477/77, 118, 120, 121; 74/335, 336 R, 339; 701/58, 54, 62

[56] References Cited

U.S. PATENT DOCUMENTS 5,989,155  11/1999  Wadas et al. ........................... 477/111
6,017,291   1/2000  Ailes et al. ............................. 477/124

FOREIGN PATENT DOCUMENTS 62-12050   3/1987   Japan .

*Primary Examiner*—Charles A Marmor
*Assistant Examiner*—Tisha D. Waddell
*Attorney, Agent, or Firm*—Burns, Doane, Swecker, Mathis, LLP

[57] ABSTRACT

A shifting device for a synchromesh-type transmission is designed to detect an accurate change of the input rotation of each area of the shifting operation, and to set the applying load to the shifting fork based on the change of input rotation. The shifting device for a synchromesh-type transmission includes a detecting device for detecting a rotation change rate of an input shaft, a judging device for judging a balk point based on the rotation change rate of the input shaft detected by said detecting device, and a transmission controlling mechanism including an electric-controlled driving device for driving a shift actuator to shift the shift fork. The driving device controls a drive current to the shift actuator when the balk point is detected by the judging device.

29 Claims, 5 Drawing Sheets

SHIFTING DEVICE FOR SYNCHROMESH-TYPE TRANSMISSION

DETAILED EXPLANATION OF THE INVENTION

1. Field of the Invention

This invention relates to a shifting device for synchomesh-type transmission.

2. Related Background Art

Generally, in order to change a shift in a speed changing apparatus (transmission), rotation of an input shaft (input rotation) connected to a clutch disc of an engine side and rotation of an output shaft (output rotation) of an driven wheel side should be coincided (synchronized). For this purpose, a synchromesh mechanism is used for transmitting rotation of an free-rotatable geardisposed around the output shaft to the output shaft smoothly. The synchromesh mechanism includes a synchronizer hub spline-mounted on the output shaft, a sleeve fitted on an outer peripheral surface of the synchronizer hub and having a groove with which a shift fork engages, and a synchronizer ring frictionally contacting with a cone surface of the free-rotatable gear by a shifting operation of the shift fork. The shift fork is driven by an operating load applied by an actuator of a hydraulic circuit.

For synchronizing the input rotation and the output rotation in shifting, the shift fork is shifted so that the synchronizer ring is pushed to the free-rotatable gear via the sleeve. This shifting operation of the fork shift is preferably performed in short time in aspect of time, but is preferably performed moderately when a vehicle shock and an enduring character of mechanism are taken into consideration.

That is, the shifting operation of fork shift includes a shift draw-out/push-in area from draw-out of shift to start of synchronization, a synchronizing area where the synchronizer ring frictionally contacts with the free-rotatable gear, and a push-apart area where the sleeve meshes with the free-rotatable gear.

Load of the shift fork driven by the shift actuator needs small at the shift draw-out/push-in area and the push-apart area in view other vehicle shock and enduring character of the mechanism, and needs large at the synchronizing area in view of secure synchronization.

The input rotation before and after the synchronization includes, a first changing point (rotation drop point), second changing point (index point) and third changing point (balk point). The rotation drop point occurs when the clutch disc is brought into the interrupted state, the index point occurs when the synchronizer ring is pushed onto the cone surface by the key, and the balk point occurs when the synchronizer ring is pushed onto the cone surface by the direct pushing of the synchronizer ring by the sleeve. At the drop point and the index point of the input rotation, the applying load to the shift fork can be small because the synchronizing has not started at these points. To the contrary, the applying force needs to be changed corresponding to a speed changing condition after the balk point where the shifting load is large.

Here, what is required for the vehicle shock is to control the load in which the vehicle shock does not occur by detecting the balk point accurately, because the load at the balk point where the cone torque occurs is high, some trouble in the driving system will occur suddenly. And required for the enduring character of mechanism is to set the applying load to the shift fork so that the synchronization completes in the allowable predetermined shifting time.

With respect these requirements, in a speed changing control system disclosed in Japanese Examined (Koukoku) Patent No.62-12050 for example. the applying load to the shift fork is controlled only by the flow path switching valve, when the speed changing shift is selected corresponding to a kick-down amount of a accelerate pedal.

SUMMARY OF THE INVENTION

The present invention is made in view of the above mentioned circumstances. An inventor of this invention, as result of various study, noticed to detect the balk point by utilizing the difference of changing rate of the input rotation before and after the synchronization. That is, the changing rate of the input shaft is largest at the balk point, is smallest at the rotation drop point and is intermediate at the index point due to difference of the pushing load of the cone surface. However, in order to achieve the shifting operation which does not generate the vehicle shock at the balk point, it is insufficient to merely detect change of the input rotation for changing or switching the applying load of the shift actuator corresponding to the detected result. The inventor noticed the change of input rotation in the shifting operation, and found the subject to be solved by the present invention is to detect an accurate change of the input rotation in the shifting operation, and to set the applying load to the shifting fork based on the change of input rotation.

In order to solve the above subject, the inventor noticed the relation that the change rate of the input rotation is large in the order of the balk point, index point and rotation drop point, and that as the input rotation increases the rotation drop increases. Based on it, the input rotation and the change rate of input rotation at the balk point have relation which can be approximated by a linear equation. In view of this, this relation is approximated by the linear resursion to accumulate the most suitable change rate of input rotation corresponding to the input rotation. When an input rotation change rate larger than thus accumulated change rate is detected, it can be judged or assumed as the accurate balk point.

1) The shifting device for synchromesh-type transmission of the first invention is comprised of a detecting means for detecting a rotation change rate of an input shaft, a judging means for judging a balk point based on the rotation change rate of the input shaft detected by said detecting means, and a transmission controlling mechanism including a driving means electric-controlled for driving the shift fork, the driving means controlling a drive current to a shift actuator to shift the shift fork when the balk point is detected by said balk point judging means.

In the shifting device of the first invention, the balk point judging means judges the balk point when the rotation change rate of input shaft becomes larger than a predetermined valve. Here, the predetermined valve can be determined based on the number of rotations of the input shaft when it idly rotates due to interruption of a clutch disc in starting of speed-change.

2) The shift device for synchromesh-type transmission of the second invention is comprised a detecting means for detecting a change rate of a rotation change rate of an input shaft, a judging means for judging a balk point based on the rotation change rate of the input shaft detected by said detecting means, and a transmission controlling mechanism including a driving means electric-controlled for driving the shift fork, the driving means controlling a drive current to a shift actuator to shift the shift fork when the balk point is detected bysaid balk point judging means.

In the shifting device of the second invention, the balk point judging means judges the balk point when the rotation change rate of input shaft is larger than a predetermined valve. Here, the predetermined valve can be determined based on the number of rotations of the input shaft when it idly rotates due to interruption of a clutch disc in starting of speed-change.

In the shifting device of the first and second invention, the balk point judging means can have an allowable stroke for balk point judgment and a predetermined valve can be determined based on a shift step or stage. Further, the shifting device can have a synchronization judging means for judging the completion of synchronization when difference of relative rotation between a synchronizing side and a synchronized side becomes smaller than a predetermined difference of relative rotation.

In the shifting device of the first and second invention, the driving means of transmission controlling mechanism can map the shifting load corresponding to the predetermined time for each of up-shift and down-shift based on the relation between the shifting load and necessary time period to the completion of synchronization, and a driving current for the shift fork can be set based on the map. In this case, the driving means preferably corrects the driving current by setting a target rotation valve of the input shaft at each of time series points during the predetermined time period, and removing a deviation between the number of rotations of the input shaft and the target rotation value at each time series point.

In the shifting device of the first and second inventions operates as follows. A current for shifting the shift fork from a shift draw-out to a shift push-in is set by start of the speed-change, and the driving means of the transmission controlling mechanism is operated by the current of shift push-in, whereby the shift fork starts the shifting operation thereof.

The detecting means for rotation change rate of the first and second invention calculates the rotation change rate which is rotation change rate of the input shaft from the shift draw-out/push-in area due to interruption of the clutch disc in starting of the speed-change to the balk point where the synchromesh mechanism frictionally contacts with the free-rotatable gear. The detection means for rotation change rate of the first and second invention also calculates a change rate of the rotation change rate i.e. time series difference or differentiated valve when the synchromesh mechanism frictionally contacts with the free-rotatable gear.

After the rotation change rate at the balk point is calculated by the detecting means for rotation change rate, thus calculated rotation change rate is compared with the rotation change rate of the input shaft detected by the balk point detecting means. The balk point judging means judges the balk point when the rotation change rate detected by the balk point judging means is larger than the rotation change rate by the detecting means for rotation change rate at the balk point, and alters (makes larger) the current for shift push-in to an initial current for synchronizing. Here, the initial current for synchronization is determined by the necessary shifting load applied to the shift fork after the balk point based on the difference of relative rotation between the number of rotation of the input shaft in the detected rotation change rate thereof and the number of rotations of the output shaft.

3) A method for controlling an applying load to a shift fork in a shifting device for a synchromesh-type transmission, according to the third invention, is comprised of the steps of a step for detecting a rotation change rate of an input shaft, a step for for judging a balk point based on the rotation change rate of the input shaft detected by said detecting means, and a step for electric-controlling a drive current to a shift actuator which shifts the shift fork when the balk point is detected in said balk point judging step.

In the concrete embodying mode of the present invention, a transmission controlling mechanism can be constructed by an electric motor or a hydraulic circuit. In the latter case, for the shift actuator a hydraulic cylinder connected to the hydraulic circuit can be used. A shift fork shaft is a lod of the hydraulic cylinder, and a shift fork is attached to a tip end thereof. The shift fork engages with a groove of a shift rail selected by the shifting operation of the select actuator to shift the sleeve of the selected step or shift toward the output shaft. The free-rotatable gear is a speed-change gear such as a second gear, third gear and reverse gear.

The driving means of transmission controlling mechanism can be controlled to drive the shift actuator, and can map the shifting load corresponding to the predetermined time by a proportional relation (as the applying load increases or decreased the necessary synchronizing time period is shortened or extended) between the shifting load and necessary time to the completion of synchronization for each of up-shift and down-shift, to set a driving current (i.e. synchronizing initial current) based on the map. Also, the driving means can correct the driving current by setting a target rotation valve of the input shaft at each of time series points in the predetermined time period, and performing a feed-back control to remove a deviation between the number of rotations and the target rotation valve at each time series point.

By such operation of the driving means of the transmission controlling mechanism, an external disturbance (temperature of operating liquid), a difference between solids (a frictional coefficient $\mu$ of the synchromesh mechanism, solenoid quality) can be absorbed, so that the vehicle shock, shifting time and enduring character can be further improved. For the driving means, a solenoid valve driven by the flow amount control or pressure control can be used. The acting load of the shift actuator for driving the shift fork shaft can be adjusted by the PWM control or electric control of the solenoid valve.

The balk point judging means of the first inventions can form a map of rotation change rate of the input shaft corresponding to the number of rotations of the input shaft in interruption of the clutch disc for each shift step, to calculate the rotation change rate of the input shaft to the point based on the map. The balk point judging means of the second invention can calculate the rotation change rate of the input shaft at the balk point by the difference or differentiated valve between the rotation drop rate of the input shaft when the clutch disc shifts from the connected state to the interrupted state, and the rotation change rate of the input shaft changed from the rotation drop rate. According to such judgement, since the difference or differenciated value of the rotation drop rate differs from the rotation change rate at the balk point in the values thereof, the balk point can be detected more accurately than the case where the map in which the change rate of input rotation and the rotation change rate in balk are approximated by the linear equation. Here, the difference or differentiated value can be mapped for each speed-change step.

The detecting means for rotation change rate and the balk point judging means of the first and second invention can be constructed by a CPU such as ECU. An allowance range can be set for the shifting operation judged by the balk point judging means, by utilizing a phenomenon that shift operation in balk point judgement temporarily stops due to collision of the sleeve to the synchronizer ring. This allowable range is used to give a guard to an erroneous judgement.

According to the present invention, the accurate change rate of the input rotation is detected in the shifting operation by the detecting means for rotation change rate, so that the balk point is detected accurately by the balk point judging means. Thus, the predetermined synchronizing initial current for controlling rotation of the input shaft can be set to reduce the vehicle shock. In addition, the shifting time of the shift fork for the completion of synchronization can be set to increase the enduring character of the synchronizing element.

PREFERRED EMBODIMENT OF THE INVENTION

Hereinafter, preferred embodiments of the present invention will be explained with reference to attached drawings. It is noted however, the present invention is not limited to these embodiment but can include various modification within scope of invention described in the columns of Claims and the Summary of the Invention.

Figure 1:
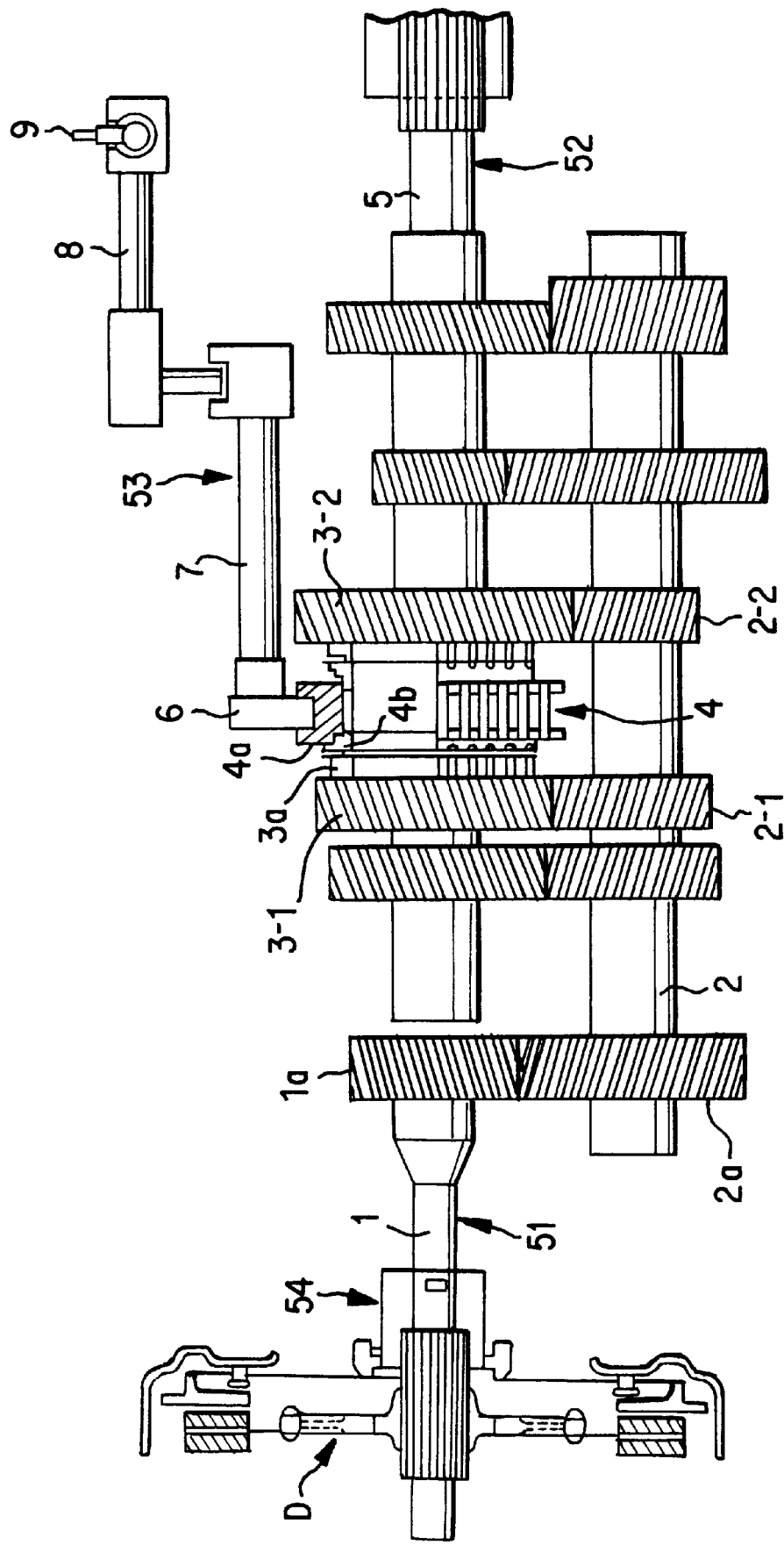
FIG. 1 is a construction view showing one example of a transmission to which the present invention is applied.

In FIG. 1, a clutch disc D is connected to an input shaft 1 which constitutes a main shaft of a speed-changing mechanism i.e. transmission, and a counter driven gear 2a mounted on a counter shaft 2 which is parallel to the input shaft 1 engages with a driving gear 1a mounted on a input shaft 1. Counter gears 2-1 and 2-2 mounted on the counter shaft 2 mesh with free-rotatable gears 3-1 and 3-2 mounted on an output shaft 5 disposed co-axial with the input shaft 1 to be idly rotated. The free-rotatable gears 3-1 and 3-2 is mounted on the output shaft 5 via a synchromesh mechanism 4 to be rotated synchronous therewith, thus transmitting rotation of the input shaft 1 to the output shaft 5 by making the free-rotatable gears 3-1 and 3-2 integral with the output shaft 5 by the synchromesh mechanism 4 driven by a fork 6.

The synchromesh mechanism 4 is, as is known, comprised of cone portions 3a of the free-rotatable gear 3-1, sleeve 4a, shifting key (not shown), and synchronizer ring 4b. The sleeve 4a is engaged by the fork 6 which is shifted by an shift actuator 9 (refer to FIG. 2) via a shift fork shaft 7 and a shift/select shaft 8. The shift. fork shaft 7 is selectively operated by a select actuator (refer to FIG. 2) via the shift/select shaft 8.

In speed-changing, the synchromesh mechanism 4 operates as below. That is, by the shifting operation of shift fork 6 by the shafts 7 and 8 and actuator 9, the synchronizer ring 4b is pushed onto the cone portion 3a of free-rotatable gear 3-1 via the sleeve 4a.

As a result, the sleeve 4a is disengaged from the shifting key to push the synchronizer ring 4b onto the cone portion 3a by large force.

Thus, the synchronizing torque is transmitted from the sleeve 4a to the free-rotatable gear 3-1, so that difference of the number of rotations therebetween is reduced. The sleeve 4a and the free-rotatable gear 3-1 finally meshes with when circumferential speeds thereof coincide with each other.

Near the input shaft 1 or the counter shaft 2 and near the output shaft 5, sensors 51 and 52 which are comprised of for example hole element for detecting the number of rotations thereof is provided, near the shift fork 6 or the forkshaft 7a stroke sensor 53 for detecting a shifting operation or shifting speed is provided, and near the clutch disc D or a release cylinder for operating it a stroke sensor 54 for detecting a connect/interrupt condition of the clutch disc 54 is provided, respectively. These sensors 51 to 54 are electrically connected to a microcomputer (for example ECU) to be explained later.

Figure 2:
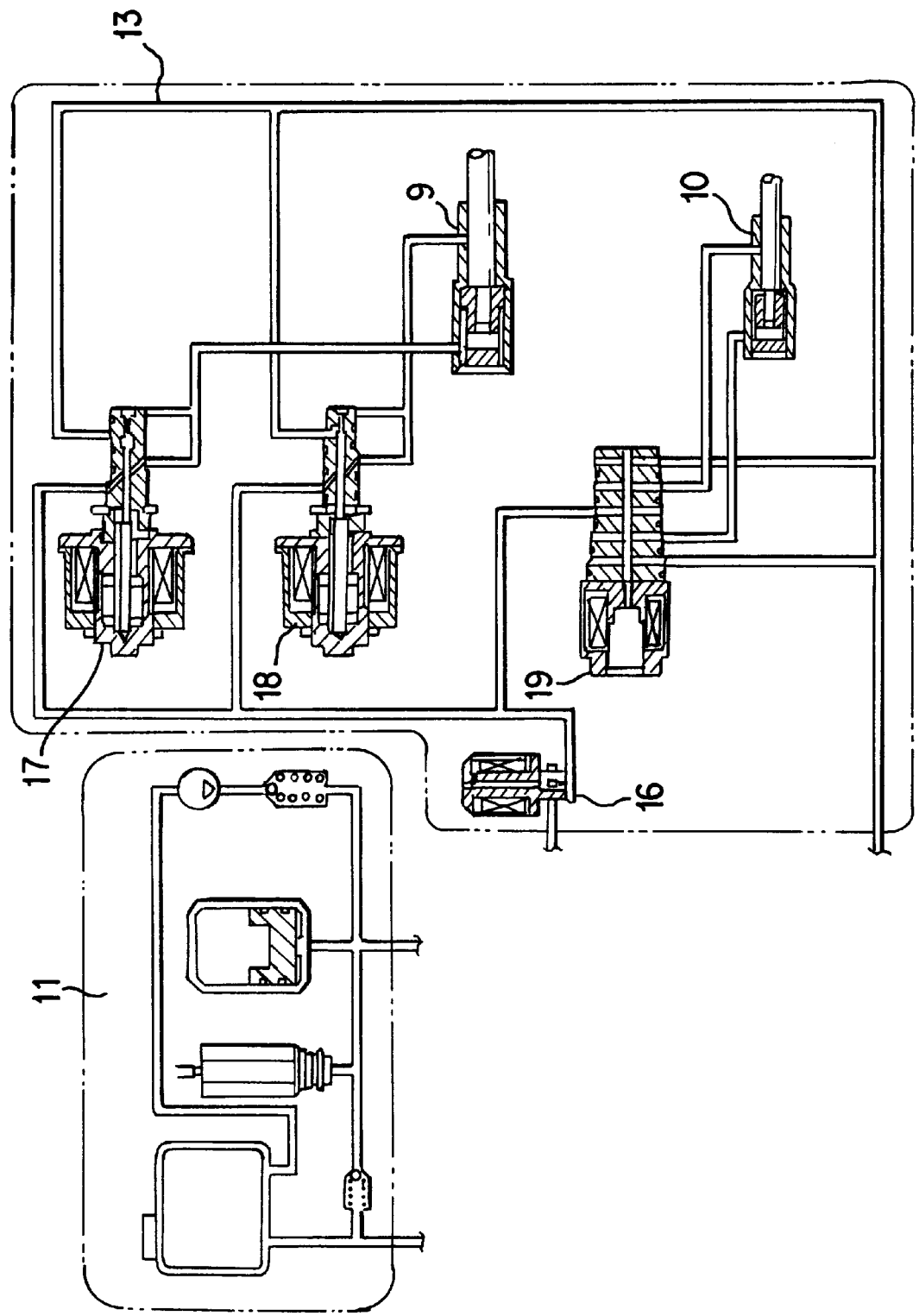
FIG. 2 is a construction view showing one example of a transmission controlling mechanism for controlling the above transmission.

FIG. 2 is an explanatory view for explaining a hydraulic system which constructs the shifting device.

A hydraulic source 11 supplies fluid pressure to control selection and speed-change of the shift forks 6 to a shift select controlling portion 13. The shift select controlling portion 13 is comprised of a main solenoid 16, a solenoid for shift 17 for pushing out the shift forks 6 respectively connected to the main solenoid 16, a solenoid for shift 18 for drawing in the shift fork 6, a solenoid for select 19, and a select actuator 10 connected to the solenoid for select 19. The solenoids for shift 17 and 18 operate as a pressure controlling means for changing of the shift actuator 9 to shift the shifting fork. These solenoid valves 16 to 19 are PWM-controlled or electric-controlled by a micro-computer.

The above hydraulic system operates as follows. The main solenoid valve 16 supplies the pressure fluid to the solenoids for shift 17 and 18, and the solenoid for select 19. The solenoids for shift 17 and 18 operate as a pressure controlling valve to shift the shift actuator 9 in opposite directions, and to control the fluid pressure supplied to a cylinder chamber of the shift actuator 9 by the PWM-control etc. of the above micro-computer. To the micro-computer, the detected output from each of the sensors 51 to 5 4 are inputted for change the applying load to shift the shift fork shaft 7. The solenoid for select 19 controls the select actuator 10 to select a shaft and the fork shaft to be shifted corresponding to the shift (speed change shift).

Next, operation of the transmission by the hydraulic system of FIG. 2 with be explained. The speed change shift is determined by the micro-computer based on a driver's intention and a running condition of the vehicle, and the shaft and the fork shaft 7 to be operated by the select actuator 10 are selected, so that one of the solenoids for shift 17 and 18 is operated. Thus, the shift fork 6 is shifted via the actuator 9 to operate the synchromesh mechanism 4, whereby the speed-changing operation is performed.

Figure 3:
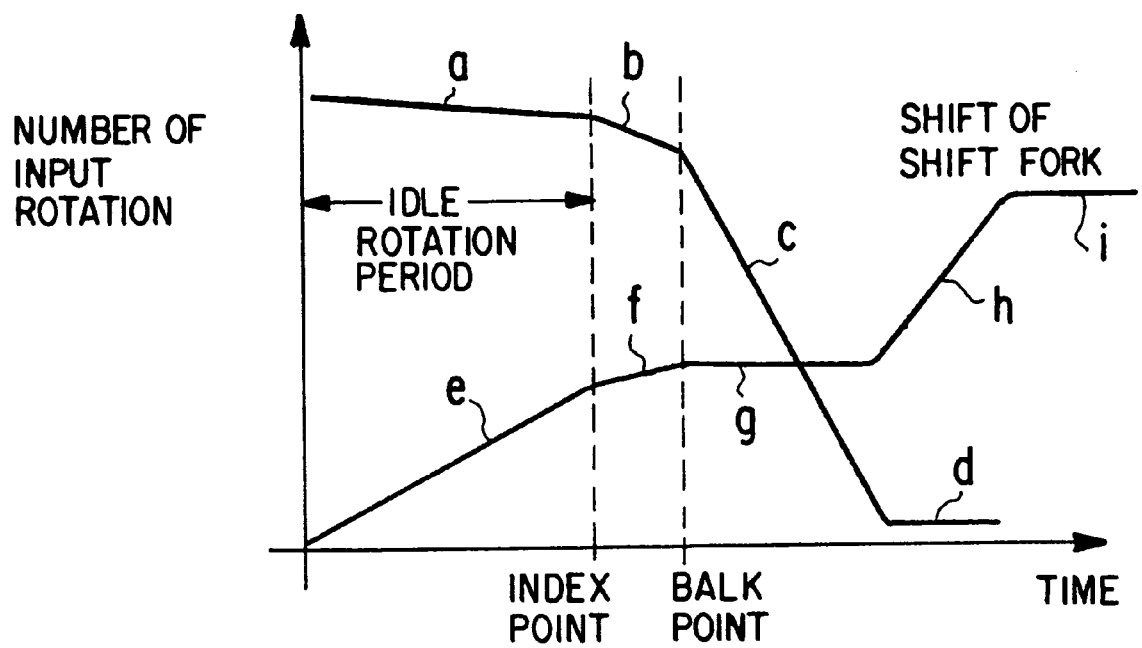
FIG. 3 shows a time character view of the number of rotation of the input shaft in the shifting operation, in which an ordinate shows the number of input rotation and an abscissa shows the time.

FIG. 3 shows a relation between the number of rotations of the input shaft 1 and a shifting shift of the fork shaft 7, and the time, when the shift is changed from a low-speed to a high-speed. The number of rotations of the input gear 1 is the number relative to the transmission and coincides with the number of rotations of the clutch. An "index point" is a point where the synchronizer ring 4b encounters with the shifting key firstly, which is also a point where the synchronizer ring 4b contacts with the cone portion 3a of the free-rotatable gear 3 firstly to transmit the synchronizing torque thereto. A "balk point" is a point where the synchronizing torque is transmitted from the ring 4b to the free-rotatable gear 3-1 during the speed-changing operation.

As shown in FIG. 3, (i) in a shift draw-out area (idle rotation period) a where the clutch disc D is interrupted, the sleeve 4a is separated from one free-rotatable gear 3-2 and encounters with the synchronizer ring 4b, the number of input rotation gradually decreases by the constant rate mainly due to resistance of the counter shaft 2 to stir the operating liquid. At this time, the shifting speed of the fork shaft 7a is high as shown by a line e. (ii) Then, in a shift push-in area b from the index point to the balk point, the decreasing rate of the number of input rotation becomes larger than that of the shift draw-out area a. At this time, the shifting shift of the fork shaft 7 decreases as shown by a line f. (iii) After the balk point, the decreasing rate of the number of input rotation becomes larger than that of the line b as shown by a line c, and becomes constant as shown by a line d when the free-rotatable gear 3-1 and the sleeve 4a mesh with each other perfectly. The shifting shift of the fork shaft 7 is stopped logically as shown by a line g while the number of input rotation decreases(c), and increases again as shown by a line h when the number of input rotation is stopped (i.e. piece push time of the free-rotatable gear 3-1), and then becomes constant as shown by a line i. Thus, the shifting operation is completed. The transmission which adopts the synchromesh mechanism 4 generally operated as mentioned above.

Figure 4:
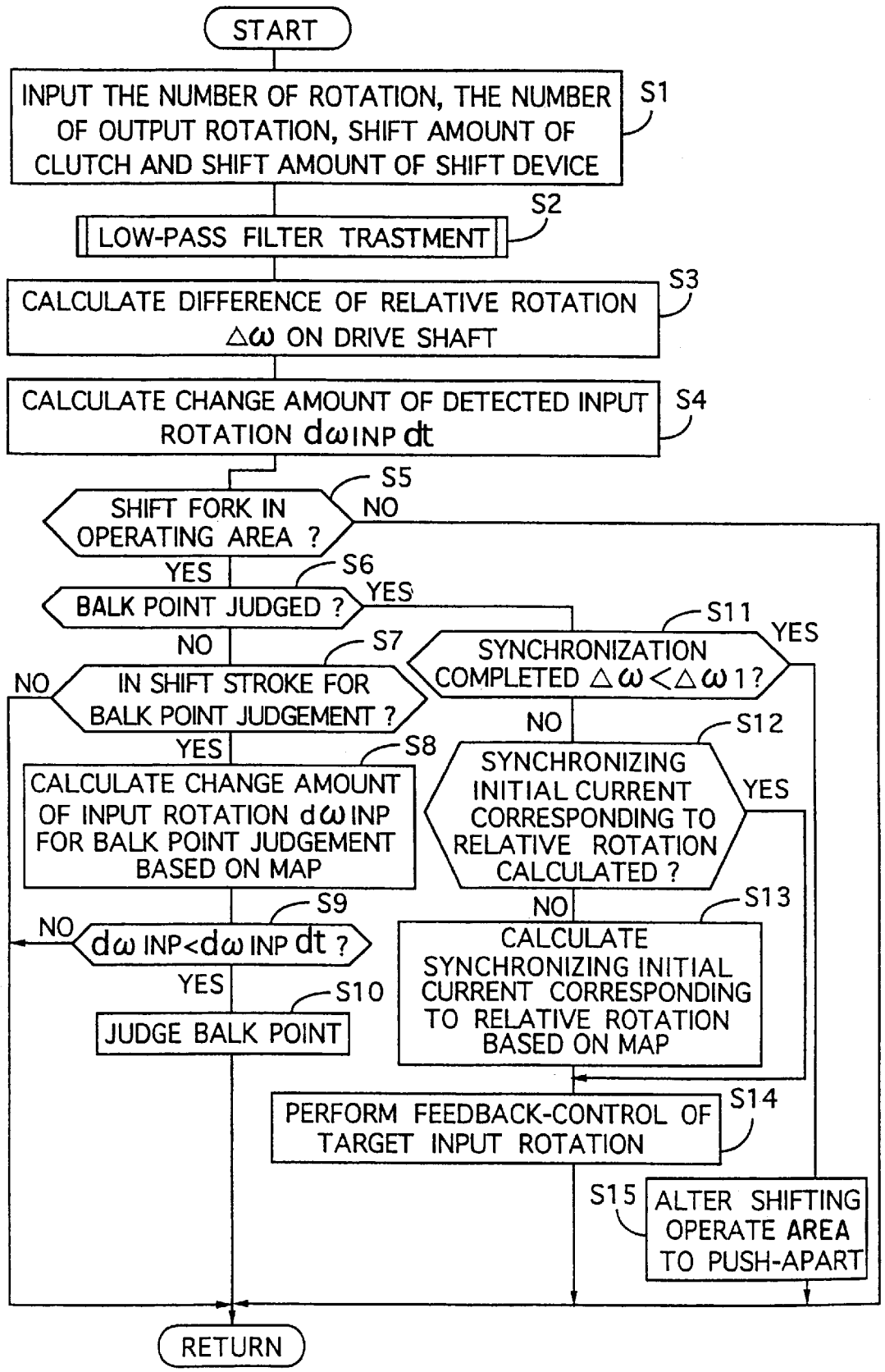
FIG. 4 is a flow chart showing the operation of the above controlling operation.

Here, according to the present invention, the speed changing operation is performed with calculating a solenoid fluid pressure to the shift actuator 9, 10 by the micro-coumputer along by a flowchart shown in FIG. 4, during time periods (i) to (iii). This program includes (a) take-in of data from the sensors, (b) calculation of the relative rotation on the input shaft and the change amount of input shaft rotation, (c) balk judgement performed by calculating a judge value corresponding to the input rotation based on a predetermined map, (d) correction of synchronizing treating current performed after judgement of the balk point by calculating synchronizing initial current based on the map, and (e)completion of synchronization when the relative rotation is judged to be smaller than the predetermined value.

In detail, after the balk point judging program started, in a step S1, the number of input rotations, the number of output rotations, shift amount of clutch device, and shift amount of shift device which are detected by the sensors 51 to 54 are inputted. In a step S2, a low-pass filtering treatment is performed to remove a variable component of the number of rotation. The steps S1 and S2 correspond to the above process (a).

In a process S3, a relative rotation difference on input shaft 1 which is a difference of the number of rotations between the input 1shaft and the output shaft 5 and is calculated by subtracting the number of output shaft 5 from the number of input shaft 1 detected by the sensors 51 and 52 is calculated. In a step S4, a change rate of detected input rotation detected by the sensor 51 is calculated. The steps S3 and S4 correspond to the above process (b).

In a step S5, based on an input from the sensor 53, whether the shift fork 6 is positioned at an operating area (i.e. shift change state) or not is judged. If the judgement is NO, which means the shift is positioned in a shift draw-out stage or shift push-apart area, the program returns. To the contrary, if the judgement is YES, which means the shift is positioned in a shift push-in area or synchronize area, whether the balk point judgement has been completed or not is judged at a step S6. If the judgement is NO, whether the shift is within a shift stroke area for balk point judgement or not is judge. Here, the "shift stroke area for balk point" means an area where the shifting operation stops temporarily due to abutment of the sleep 4a to the synchronizer ring 4b.

Figure 5:
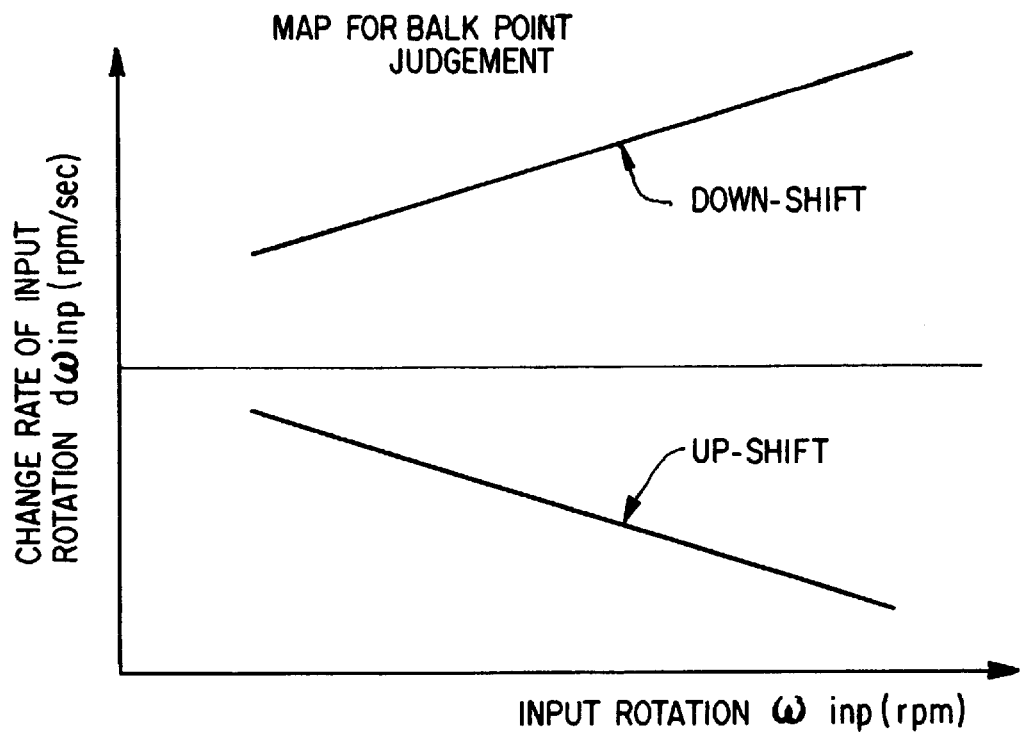
FIG. 5 shows one example of the balk point judging map used in a controlling flow of the present invention, in which an ordinate shows the change rate of input rotation and an abscissa shows the input rotation.

When judgement in a step S7 is YES, a change rate of input rotation for judgement $d\omega$ inp is calculated at a step S8 by using a map for balk point judgement shown in FIG. 5, to compare it with the change rate of detected input rotation $d\omega$ input obtained at the step S4. In the map for balk point judgement of FIG. 5, a change rate of the smallest rotation of the input shaft 1 which is occurred at the balk point where the synchromesh mechanism 4 frictionally contacts with the free-rotatable gear 3 is dated. As apparent from FIG. 5, the number of rotations $\omega$ inp of the input shaft 1 and the change rate of input rotation for judgement $d\omega$ inp have a relation which can be approximated by a linear equation, and the change rate $d\omega$ inp decreases as the number of rotations $\omega$ inp increases in the case of up-shift, while it increases in the case of down-shift. In a step 10, the balk point is judged when the change rate of detected input rotation $d\omega$ input is larger than the change rate of input shaft for judgement $d\omega$ inp corresponding to the number of rotations $\omega$ inp on this map.

When NO is judged in the step S6, it is logically possible to return the program at once, but by providing the steps S7 to S10 which correspond to the above process (c), the program is guarded from the erroneous judgement of balk point.

Figure 6:
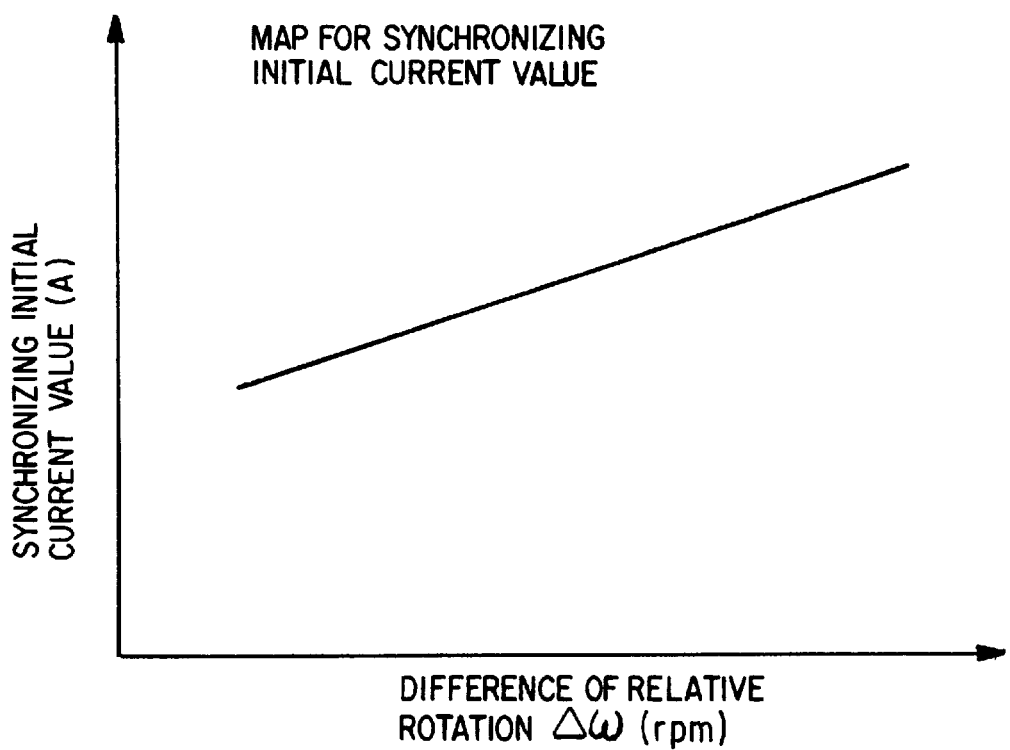
FIG. 6 shows a map for synchronizing initial current value used in the controlling flow of the present invention, in which an ordinate show a current value and an abscissa shows difference of relative relation.

On the other hand, when YES is judged in the step S6, which means the balk point has been already judged, the program advances to a step 11 to judge the synchronization has been completed or not. In the step S11, the relative rotation difference on input shaft $\Delta\omega$ calculated by the step S3 and a predetermined rotation difference $\Delta\omega1$ set in advance are compared to judge the relation of $\Delta\omega<\Delta\omega1$ for judgement of synchronization completion is satisfied or not. If the judgement is YES, that is completion of synchronization is judged, the program advances to a step 15 for a push-apart where the shift operating area is altered to a shift-apart. In the push-apart area, the sleeve 4a and the teeth of free-rotatable gear 3 are just before meshing, the numbers of rotation of the input shaft 1 and that of the output shaft 5 have relation to be meshed with each other. The steps S11 and S15 correspond to the above process (e). To the contrary, if the judgement is NO, that is incompletion of synchronization is judged in the step 11, the program advances to a step 12 to judge whether a synchronizing initial current corresponding to the relative rotation is calculated or not. If NO which means the current has not been calculate is judged, the program advances to a step s13 where the shifting load corresponding to the relative rotation difference based on the synchronizing initial current value shown in FIG. 6 is calculated, and the synchronizing initial current value for driving the shift fork 6 proportional to the shifting load is calculated.

When YES is judged, which means the synchronizing initial current has been calculated in the step S12, the program advances to a step S14 where a target rotation valve of the input shaft 1 is set at each of time series points during the necessary time period for synchronization, and the calculation for removing deviation between the number of rotation of the input shaft 1 at each time series point and the target rotation valve is performed by the feedback control.

The deviation is reduced to the minimum by the controlling operation performed by combining the PID control arbitrarily. By this feedback control, external disturbance (temperature of the operating liquid) and solid difference (friction coefficient $\mu$ of the synchromesh mechanism 4, solenoid quality etc.) can be absorbed.

For example, when usage of the shifting device in low temperature, the change rate of input rotation at the rotation drop point, index point and balk point may be larger than that of normal temperature. For making the error of synchronizing initial current due to the external disturbance as small as possible, the synchronizing initial current value read from the map by the cycle of computer is corrected over the necessary time period for synchronization. For this reason, the step 14 can be omitted logically, if no external disturbance etc. is existed. The steps 12 to S14 correspond to the process (e).

As mentioned above, in this embodiment, the controlling of shifting device in which the balk point is judged and the synchronizing initial current is set, in view of the vehicle shock, shifting time and enduring character, can be performed.

Another embodiment, that is deformation of the detecting means for rotation change rate will be explained in the following. It is possible, in the step S8, to calculate the change rate of rotation of the input shaft 1 at the balk point, by a difference between the rotation drop rate when the clutch disc D shifts from the connected state to the interrupted state and the rotation change rate of the input shaft 1 changed from the rotation drop rate, or a differenciated value. As can be observed from FIG. 3, the difference of rotation drop rate or the differentiated valve thereof differs from the rotation change rate in value, which makes the detection of balk point possible.

In addition, in the step s13, the driving current can be set with reference to the relation between the shifting load and the necessary time period for synchronization. That is, they are inverse-proportional to each other, so when the shifting load is increased cixe necessary time period for synchronization is shorted, and when the load is decreased the time period is extended. By utilizing this relation, the necessary time period for synchronization can be adjusted by adjusting a pressure value by a linear lolenoid valve which uses a pressure adjusting valve. Thus, the shifting load corresponding to the predetermined necessary time period for synchronization (i.e. synchronizing initial load) can be mapped for each up-shift and each down-shift.

What is claimed is:

1. A shifting device for a synchromesh-type transmission, comprising:
   detecting means for detecting a rotation change rate of an input shaft;
   judging means for judging a balk point based on the rotation change rate of the input shaft detected by said detecting means; and
   a transmission controlling mechanism including a driving means electric-controlled for driving a shift actuator to shift the shift fork, the driving means controlling a drive current to the shift actuator when the balk point is detected by said balk point judging means, wherein the driving means of said transmission controlling mechanism maps a shifting load corresponding to a predetermined necessary time period based on a relation between the shifting load and a necessary time period up to a completion of synchronization for each of up-shift and down-shift, and controlling a driving current to the shift fork based on the map.

2. A shifting device for a synchromesh-type transmission according to claim 1, wherein said detecting means calculates a change rate of rotation of the input shaft from a shift draw-out/push-in to the balk point.

3. A shifting device for a synchromesh-type transmission according to claim 1, wherein said balk point judging means judges the balk point when the rotation change rate of the input shaft becomes larger than a predetermined value.

4. A shifting device for a synchromesh-type transmission according to claim 1, wherein the driving means of said transmission control mechanism determines a target rotation value of the input shaft at each of time series points during the necessary time period, and performing a feedback control for removing deviation between the number of rotation of the input shaft at each time series point and the target rotation value of the input shaft to correct the driving current.

5. A shifting device for a synchromesh-type transmission according to claim 1, wherein the driving means of said transmission controlling mechanism adjusts an acting load to the shift fork after the balk point is judged by said judging means.

6. A shifting device for a synchromesh-type transmission according to claim 3, wherein the predetermined value is determined based on the number of rotations of the input shaft when the input shaft idly rotates due to interruption of a clutch disc in starting of speed-change.

7. A shifting device for a synchromesh-type transmission according to claim 3, wherein the predetermined value is determined based on a shifting shift.

8. A shifting device for a synchromesh-type transmission according to one of claim 3, wherein said balk point judging means has an allowable stroke of balk point judgement for a shift stroke.

9. A shifting device for a synchromesh-type transmission, comprising:
   detecting means for detecting a rotation change rate of an input shaft;
   judging means for judging a balk point based on the rotation change rate of the input shaft detected by said detecting means;
   a transmission controlling mechanism including a driving means electric-controlled for driving a shift actuator to shift the shift fork, the driving means controlling a drive current to the shift actuator when the balk point is detected by said balk point judging means; and
   synchronization judging means for judging a completion of synchronization, when a difference in relative rotation between a synchronizing side and a synchronized side becomes smaller than a predetermined difference of relative rotation.

10. A shifting device for a synchromesh-type transmission according to claim 9, wherein said detecting means calculates a change rate of rotation of the input shaft from a shift draw-out/push-in to the balk point.

11. A shifting device for a synchromesh-type transmission according to claim 9, wherein said balk point judging means judges the balk point when the rotation change rate of the input shaft becomes larger than a predetermined value.

12. A shifting device for a synchromesh-type transmission, comprising:
   a detecting means for detecting a change rate of a rotation change rate of an input shaft;
   a judging means for judging a balk point based on the rotation change rate of the input shaft detected by said detecting means; and a transmission controlling mechanism including a driving means electric-controlled for driving a shift actuator to shift the shift fork, the driving means controlling a drive current to the shift actuator when the balk point is detected by said balk point judging means, wherein said detecting means calculates a change rate of rotation of the input shaft at the balk point, by a difference between the rotation drop rate when the clutch disc shifts from the connected state to the interrupted state and the rotation change rate of the input shaft changed from the rotation drop rate, or a differentiated value.

13. A shifting device for a synchromesh-type transmission, comprising:

detecting means for detecting a change rate of a rotation change rate of an input shaft;

judging means for judging a balk point based on the rotation change rate of the input shaft detected by said detecting means; and a transmission controlling mechanism including a driving means electric-controlled for driving a shift actuator to shift the shift fork, the driving means controlling a drive current to the shift actuator when the balk point is detected by said balk point judging means, wherein the driving means of said transmission controlling mechanism maps a shifting load corresponding to a predetermined necessary time period based on a relation between the shifting load and a necessary time period up to a completion of synchronization for each of up-shift and down-shift, and controlling a driving current for the shift fork based on the map.

14. A shifting device for a synchromesh-type transmission according to claim 13, wherein the driving means of said transmission controlling mechanism adjusts an acting load to the shift fork after the balk point is judged by said judging means.

15. A shifting device for a synchromesh-type transmission according to claim 13, wherein the driving means of said transmission control mechanism determines a target rotation value of the input shaft at each of time series points during the necessary time period, and performing a feedback control for removing deviation between the number of rotation of the input shaft at each time series point and the target rotation value of the input shaft to correct the driving current.

16. A shifting device for a synchromesh-type transmission, comprising:

detecting means for detecting a change rate of a rotation change rate of an input shaft;

judging means for judging a balk point based on the rotation change rate of the input shaft detected by said detecting means; and a transmission controlling mechanism including a driving means electric-controlled for driving a shift actuator to shift the shift fork, the driving means controlling a drive current to the shift actuator when the balk point is detected by said balk point judging means;

said balk point judging means judging the balk point when the rotation change rate of the input shaft becomes larger than a predetermined value, the driving means of said transmission control mechanism determining a target rotation value of the input shaft at each of time series points during the necessary time period, and performing a feedback control for removing deviation between the number of rotation of the input shaft at each time series point and the target rotation value of the input shaft to correct the driving current.

17. A shifting device for a synchromesh-type transmission according to claim 16, wherein the predetermined value is determined based on the number of rotations of the input shaft when the input shaft idly rotates due to interruption of a clutch disc in starting of speed-change.

18. A shifting device for a synchromesh-type transmission according to claim 16, wherein the predetermined value is determined based on a shifting shift.

19. A shifting device for a synchromesh-type transmission according to one of claim 16, wherein said balk point judging means has an allowable stroke of balk point judgement for a shift stroke.

20. A shifting device for a synchromesh-type transmission, comprising:

detecting means for detecting a change rate of a rotation change rate of an input shaft;

judging means for judging a balk point based on the rotation change rate of the input shaft detected by said detecting means;

a transmission controlling mechanism including a driving means electric-controlled for driving a shift actuator to shift the shift fork, the driving means controlling a drive current to the shift actuator when the balk point is detected by said balk point judging means; and synchronization judging means for judging a completion of synchronization, when difference of relative rotation between a synchronizing side and a synchronized side becomes smaller than a predetermined difference of relative rotation.

21. A method for controlling an applying load to a shift fork in a shifting device for a synchromesh-type transmission, comprising:

detecting a rotation change rate of an input shaft, or change rate of the rotation change rate of an input shaft;

judging a balk point based on the detected rotation change rate of the input shaft; and electric-controlling a drive current to a shift actuator for shifting the shift fork, when the balk point is detected, wherein said detecting includes calculating a change rate of rotation of the input shaft at the balk point by a difference between the rotation drop rate when the clutch disc shifts from the connected state to the interrupted state and the rotation change rate of the input shaft changed from the rotation drop rate, or a differentiated value.

22. A method for controlling an applying load to a shift fork in a shifting device according to claim 21, wherein said detecting includes calculating a change rate of rotation of the input shaft from, a shift draw-out/push-in to the balk points.

23. A method for controlling an applying load to a shift fork in a shifting device according to claim 21, wherein said judging, includes judging the balk point when the rotation change rate of the input shaft becomes larger than a predetermined valve.

24. A method for controlling an applying load to a shift fork in a shifting device for a synchromesh-type transmission, comprising:

detecting a rotation change rate of an input shaft, or change rate of the rotation change rate of an input shaft;

judging a balk point based on the detected rotation change rate of the input shaft; and electric-controlling a drive current to a shift actuator for shifting the shift fork, when the balk point is detected, wherein said electric-controlling includes driving means of a transmission controlling mechanism mapping a shifting load corresponding to a predetermined necessary time period based on a relation between a shifting load and a necessary time period to a completion of synchronization for each of up-shift and downshift, and controlling a driving current for the shift actuator based on the map.

25. A method for controlling an applying load to a shift fork in a shifting device according to claim 24, wherein said detecting includes calculating a change rate of rotation of the input shaft from a shift draw-out/push-in to the balk point.

26. A method for controlling an applying load to a shift fork in a shifting device according to claim 24, wherein said judging includes judging the balk point when the rotation change rate of the input shaft becomes larger than a predetermined valve.

27. A method for controlling an applying load to a shift fork in a shifting device for a synchromesh-type transmission, comprising:

detecting a rotation change rate of an input shaft, or change rate of the rotation change rate of an input shaft;

judging a balk point based on the detected rotation change rate of the input shaft;

electric-controlling a drive current to a shift actuator for shifting the shift fork, when the balk point is detected; and judging a completion of synchronization, when a difference in relative rotation between a synchronizing side and a synchronized side becomes smaller than a predetermined difference of relative rotation.

28. A method for controlling an applying load to a shift fork in a shifting device according to claim 27, wherein said detecting includes calculating a change rate of rotation of the input shaft from a shift draw-out/push-in to the balk point.

29. A method for controlling an applying load to a shift fork in a shifting device according to claim 27, wherein said judging includes judging the balk point when the rotation change rate of the input shaft becomes larger than a predetermined valve.

* * * * *